May 28, 1968     D. M. WALDORF     3,385,664
NITRIC ACID MANUFACTURE USING PERCHLORIC ACID
Filed Nov. 10, 1964
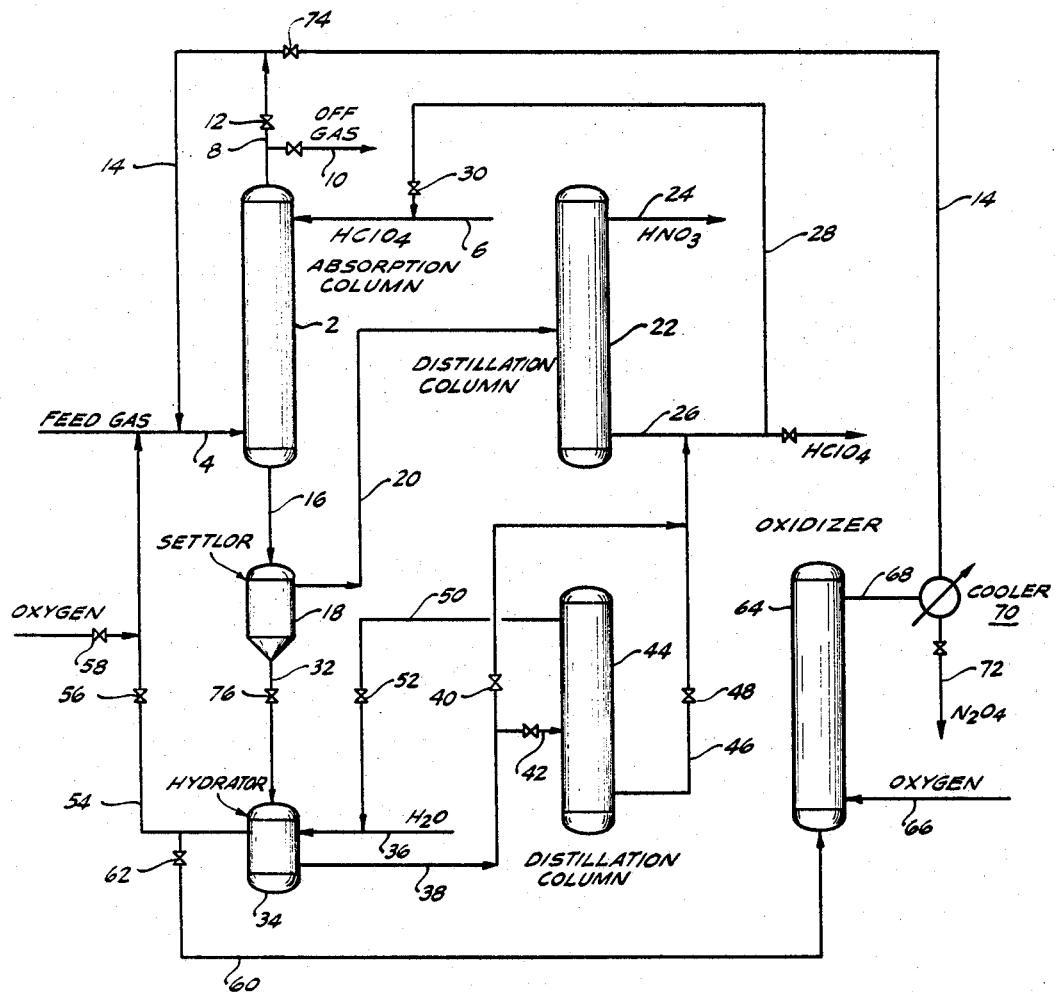
NITRIC ACID PROCESS
INVENTOR.
DANIEL M. WALDORF
BY
Richard C. Witherspoon
ATTORNEY 3,385,664
NITRIC ACID MANUFACTURE USING
PERCHLORIC ACID
Daniel M. Waldorf, La Habra, Calif., assignor to Union
Oil Company of California, Los Angeles, Calif., a corporation of California
Filed Nov. 10, 1964, Ser. No. 410,156
10 Claims. (Cl. 23—157)

ABSTRACT OF THE DISCLOSURE

The invention comprises the use of perchloric acid for the absorption of nitrogen oxides, forming nitric acid and a solid nitrosyl perchlorate precipitate. The precipitate is separated from the liquid which is distilled to obtain a concentrated nitric acid distillate. The perchloric acid is recycled directly to the absorption column while the solid nitrosyl perchlorate is passed to a hydrator where it is hydrolyzed to perchloric acid and nitrogen oxides. The nitrogen oxides are recovered and recycled to the absorption column, the perchloric acid recovered from the hydrator is concentrated by the removal of water and recycled to the absorption column. Any nitric oxide in the feed gas and the nitric oxide formed in the hydration of the nitrosyl perchlorate can be passed into an oxidizing zone and contacted with oxygen to form additional quantities of nitrogen dioxide for absorption in the absorption zone.

Description of the invention

This invention relates to a method for the production of nitric acid; and in particular relates to a method for the production of highly concentrated nitric acid.

It is well known to produce nitric acid by the absorption of nitrogen oxides in water or aqueous nitric acid solution. Nitric acid solutions thus prepared are often concentrated by distillation; however, the maximum acid concentration which can be attained in this manner is about 68 percent by weight, which is the composition of the water-HNO$_3$ azeotrope. When it is desired to produce aqueous nitric acid of higher concentration, the dilute aqueous nitric acid can be distilled in the presence of a dehydrating agent such as concentrated sulfuric acid. However, when such procedure is followed, oxides of nitrogen are absorbed under certain conditions by the sulfuric acid and cannot readily be separated therefrom to permit such oxides to be recycled to an absorption zone for the further production of nitric acid. Consequently, commercial operations of this type have not proven to be entirely satisfactory.

Accordingly, it is an object of this invention to provide a new process for the manufacture of nitric acid.

It is an additional object of this invention to provide a new process for the manufacture of concentrated nitric acid containing more than about 68 percent by weight nitric acid.

It is a further object of this invention to provide a continuous method for the production of concentrated nitric acid by selective absorption of nitrogen dioxide in a solution which is capable of being regenerated for further nitric acid production.

Additional objects of this invention will appear from the following description, the accompanying drawing and the appended claims.

I have discovered that the aforementioned objectives can be achieved by contacting nitrogen dioxide with aqueous perchloric acid to form a mixture of nitric and perchloric acids and a solid precipitate which is readily removed from said acid mixture. The acid mixture is thereafter distilled to obtain a concentrated nitric acid overhead and perchloric acid bottoms.

In its simplest embodiment, my invention comprises contacting nitrogen dioxide in an absorption zone with aqueous perchloric acid of greater than about 55 percent by weight concentration to produce a mixture of nitric and perchloric acids and a precipitate of solid nitrosyl perchlorate, separating said acid mixture from said solid precipitate, and distilling the separated acid mixture to produce an overhead of concentrated nitric acid and bottoms of aqueous perchloric acid. In its preferred embodiment, the solid nitrosyl perchlorate precipitate produced in the absorption zone is contacted with water in a hydrator to form aqueous perchloric acid and a mixture of nitric oxide and nitrogen dioxide which is recycled to the absorption zone. Additional modifications include distilling the aqueous perchloric acid produced in the hydrator to remove excess water and oxidizing the nitrogen oxides, produced in said hydrator zone, to nitrogen tetroxide and nitrogen dioxide.

When an aqueous solution of perchloric acid containing greater than about 55 percent by weight perchloric acid, i.e., 55 to 95 percent, and preferably 60 to 80 weight percent, is contacted with a nitrogen dioxide containing gas, nitrogen dioxide in said gas is readily absorbed by said aqueous acid. The absorption involves the following chemical reaction:

(1)     $2NO_2 + HClO_4 \rightarrow NOClO_4\downarrow + HNO_3$ 

The nitrogen dioxide is supplied in the gaseous state and the perchloric acid is used in excess. In carrying out the absorption, the nitrogen dioxide containing gas is preferably contacted with the perchloric acid in a countercurrent flow relationship at a temperature of about 5 to 200° F. and preferably about 40 to 120° F. Nitrogen dioxide containing feed gases having a high nitrogen dioxide concentration, e.g., to 100 volume percent, are preferred; however, gases having very low nitrogen dioxide concentration, e.g. 0.05 to 2 percent, can also be used. The term "nitrogen dioxide" as employed herein connotes $NO_2$, $N_2O_4$ or such equilibrium mixture of $NO_2$ and $N_2O_4$ as may exist under the conditions prevailing in the various steps of the process. Various well known methods for the manufacture of nitrogen dioxide are described in U.S. Patent 3,099,531.

The aqueous acid mixture and solid nitrosyl perchlorate produced in the absorption step are readily separated by well known solid-liquid separation methods to produce an aqueous mixture of nitric and perchloric acids and solid nitrosyl perchlorate. The separated acid mixture is then subjected to distillation to separate the nitric acid from the perchloric acid. Since perchloric acid is a dehydrating agent which combines with the water present in said mixture, the distillation produces an overhead consisting of highly concentrated nitric acid, e.g., acid of 90 weight percent or higher concentration.

A modification of my invention includes contacting the solid nitrosyl perchlorate which separated from the nitric and perchloric acid mixture with sufficient water to react with said perchlorate to form aqueous perchloric acid and a gaseous mixture of nitric oxide and nitrogen dioxide. Preferably sufficient water is employed to produce an aqueous perchloric acid solution of 1 to 40 percent by weight perchloric acid and preferably 20 to 40 percent by weight. This reaction is illustrated by the following equation:

$H_2O + 2NOClO_4 \rightarrow 2HClO_4 + NO_2\uparrow + NO\uparrow$ 

The perchloric acid thus formed is recycled to the nitrogen dioxide absorption zone. Excess water used in the reaction may be removed from the dilute acid prior to recycle by distillation to provide an aqueous acid solution of greater than about 55 percent by weight perchloric acid for recycle to the absorption zone. The nitrogen dioxide and nitric oxide produced in the reaction are also recycled to the absorption zone to be contacted therein with perchloric acid. When the feed gas flowing through the absorption zone contains oxygen, nitric oxide produced in the hydrator is oxidized to nitrogen dioxide as it is recycled through the absorption zone. Alternatively, the nitrogen oxides produced in the hydrator may be contacted with oxygen in an oxidation zone prior to being recycled through the absorption zone to oxidize nitric oxide to nitrogen tetroxide and nitrogen dioxide. Preferably, the oxidation is carried out at a temperature of about 0° to 400° F. and most preferably about 60 to 100° F. A still further modification of my invention comprises passing the oxidized nitrogen oxides from the oxidation zone through a cooling zone maintained at a temperature of about 0° to 100° F., sufficient to liquify nitrogen tetroxide, which is thereafter separated from the nitrogen dioxide as a valuable by-product of my process.

The pressures employed in the absorption zone and in the oxidation zone may be atmospheric or superatmospheric. Ordinarily superatmospheric pressures are desirable since the rate of absorption and oxidation are increased by an increase in pressure. Preferably, the absorption zone is operated at a pressure of about 1 to 1,000 atmospheres with the most preferred range being 1 to 10 atmospheres. Similar pressure conditions are desirable in the oxidation zone. If pure oxygen is introduced into the oxidation zone as the oxidizing gas, the pressure may be somewhat reduced in relation to the pressure used when an oxygen containing gas such as air is used.

The invention can perhaps be best understood with reference to the accompanying drawing wherein the single figure is a schematic flow sheet illustrating the preferred form of the present invention.

Turning now to the drawing, feed gas containing nitrogen dioxide is introduced into the lower portion of absorber column 2 by way of line 4, and is passed upwardly therein in countercurrent flow to perchloric acid introduced into the upper portion of the absorber 2 via acid feed line 6. The nitrogen dioxide present in the feed gas reacts with the perchloric acid to form nitric acid and a nitrosyl perchlorate precipitate. The off gas, substantially free of nitrogen dioxide, is removed from the absorber column 2 via line 8 and valved line 10. If desired, the off-gas can be recycled through the absorption column 2 through line 8, valve 12, recycle line 14 and feed gas line 4.

The absorption column 2 is designed so that solid nitrosyl perchlorate formed in the column is washed downwardly therethrough by the aqueous nitric and perchloric acid solution flowing through said column 2, and exits via line 16 to settler 18. A solid nitrosyl perchlorate phase settles to the bottom of the settler 18 and a mixture of aqueous nitric and perchloric acids is established at the top of said settler 18. The acid mixture is withdrawn therefrom via line 20 to distillation column 22 wherein the acid mixture is distilled, with a concentrated nitric acid overhead being removed via line 24 and aqueous perchloric acid bottoms being removed via valved line 26. If desired the aqueous perchloric acid bottoms may be recycled to the absorption column 2 through line 26, line 28, valve 30 and acid feed line 6.

Solid nitrosyl perchlorate is removed from settler 18 through line 32 and valve 76 to hydrator 34 wherein the nitrosyl perchlorate is contacted with water introduced via line 36. The water reacts with the perchlorate to form an aqueous solution of perchloric acid, which is withdrawn from the hydrator 34 via line 38, and a gaseous mixture of nitric oxide and nitrogen dioxide, which is withdrawn from the hydrator 34 through line 54. The aqueous perchloric acid solution is recycled directly to the absorption column through line 38, valve 40, line 46, line 26, line 28, valve 30, and acid feed line 6 wherein it is blended with the concentrated perchloric acid in line 6 to form an aqueous perchloric acid solution of greater than 55 percent by weight concentration. Alternatively, the aqueous perchloric acid solution formed in hydrator 34 can be routed through a second distillation column 44 via line 38 and valved line 42. In distillation column 44, the aqueous perchloric acid solution is concentrated to about 55 to 85 percent by weight perchloric acid. The concentrated acid bottoms from distillation column 44 are routed to absorption column 2 through line 46, valve 48, line 26, line 28, valve 30, and acid feed line 6. The water overhead from distillation column 44 is recycled to hydrator 34 via line 50, valve 52, and line 36.

The gaseous mixture of nitric oxide and nitrogen dioxide produced in hydrator 34 is recycled directly to the absorption column 2 through line 54, valve 56 and feed gas line 4. When an oxygen-containing feed gas is used, the nitric oxide produced in hydrator 34 is oxidized to nitrogen dioxide as it flows through absorption column 2. Optionally, oxygen or an oxygen-containing gas such as air can be added to the gaseous mixture of nitric oxide and nitrogen dioxide through valved line 58 to oxidize said nitric oxide prior to entering absorption column 2. Alternatively, the gaseous mixture from hydrator 34 can be routed through oxidizer 64 via line 60 and valve 62 whereupon it is contacted with oxygen which is injected into said oxidizer 64 through line 66. Nitric oxide present in the gaseous mixture is oxidized to form a mixture of nitrogen tetroxide and nitrogen dioxide which are removed from oxidizer 64 via line 68. The thus produced gases are then passed through cooler 70 whereupon the nitrogen tetroxide is liquified and removed, either as a by-product through valved line 72, or recycled to absorption column 2 via line 14, valve 74, and gas feed line 4.

In practicing this invention there is considerable latitude in the choice of temperatures and pressures, concentration and circulation of intermediate streams, arrangement of equipment, batch-wise or continuous operation, and the like. It will be understood, therefore, that the invention is by no means limited to the embodiment illustrated in the drawing, for many variations are possible within the scope of the invention depending upon specific needs and circumstances.

I claim:

1. A method for the preparation of concentrated nitric acid which comprises contacting nitrogen dioxide with an aqueous solution of greater than 55 percent by weight of perchloric acid to produce a mixture of nitric and perchloric acids and a solid nitrosyl perchlorate precipitate, separating said acid mixture from said solid precipitate, and distilling the separated acid mixture to produce an overhead of concentrated nitric acid and bottoms of aqueous perchloric acid.

2. The method of claim 1 wherein the aqueous perchloric acid bottoms are recycled to said contacting step.

3. The method of claim 1 wherein the perchloric acid solution contacted with nitrogen dioxide has a concentration of 55 to 85 percent by weight perchloric acid.

4. A method for the preparation of concentrated nitric acid which comprises:
   (1) contacting a gas containing nitrogen dioxide with an aqueous solution of greater than 55 percent by weight perchloric acid, to produce a mixture of nitric and perchloric acids and a precipitate of nitrosyl perchlorate;
   (2) separating said acid mixture from said precipitate;
   (3) distilling the separated acid mixture to produce an overhead of concentrated nitric acid and bottoms of aqueous perchloric acid;
   (4) contacting said nitrosyl perchlorate precipitate with water to form aqueous perchloric acid and a gaseous mixture of nitric oxide and nitrogen dioxide; and
   (5) recycling the aqueous perchloric acid bottoms produced in Step 3 and the aqueous perchloric acid produced in Step 4 to Step 1.

5. The method of claim 4 wherein the perchloric acid solution contacted with nitrogen dioxide has a concentration of 55 to 85 percent by weight perchloric acid.

6. A method for the preparation of concentrated nitric acid which comprises:
   (1) contacting a gaseous mixture containing nitrogen dioxide with an aqueous solution of greater than 55 percent by weight perchloric acid to produce a mixture of nitric and perchloric acids and a precipitate of nitrosyl perchlorate;
   (2) separating said acid mixture from said precipitate;
   (3) distilling the separated acid mixture to produce an overhead of concentrated nitric acid and bottoms of aqueous perchloric acid;
   (4) contacting said nitrosyl perchlorate precipitate with water to form aqueous perchloric acid and a gaseous mixture of nitric oxide and nitrogen dioxide;
   (5) distilling the aqueous perchloric acid produced in Step 4 to produce a water overhead and concentrated perchloric acid bottoms; and
   (6) recycling said concentrated perchloric acid bottoms from Step 5 and the aqueous perchloric acid bottoms from Step 3 to Step 1.

7. The method of claim 6 wherein the water overhead from Step 5 is recycled to Step 4.

8. A method for the preparation of concentrated nitric acid which comprises:
   (1) contacting a gas containing nitrogen dioxide with an aqueous solution of greater than 55 percent by weight perchloric acid to produce a mixture of nitric and perchloric acids and a precipitate of nitrosyl perchlorate;
   (2) separating said acid mixture from said precipitate;
   (3) distilling the separated acid mixture to produce an overhead of concentrated nitric acid and bottoms of aqueous perchloric acid;
   (4) contacting said nitrosyl perchlorate precipitate with water to form aqueous perchloric acid and a gaseous mixture of nitric oxide and nitrogen dioxide;
   (5) distilling the aqueous perchloric acid produced in Step 4 to produce a water overhead and concentrated perchloric acid bottoms;
   (6) recycling said concentrated perchloric acid bottoms from Step 5 and the aqueous perchloric acid bottoms from Step 3 to Step 1;
   (7) recycling the water overhead from Step 5 to Step 4; and
   (8) recycling the nitric oxide and nitrogen dioxide of Step 4 to Step 1.

9. A method for the preparation of concentrated nitric acid which comprises:
   (1) contacting a gas containing nitrogen dioxide with an aqueous solution of greater than 55 percent by weight perchloric acid to produce a mixture of nitric and perchloric acids and a precipitate of nitrosyl perchlorate;
   (2) separating said acid mixture from said precipitate;
   (3) distilling the separated acid mixture to produce an overhead of concentrated nitric acid and bottoms of aqueous perchloric acid;
   (4) contacting said nitrosyl perchlorate precipitate with water to form aqueous perchloric acid containing greater than 60 percent by weight water and a gaseous mixture of nitric oxide and nitrogen dioxide;
   (5) distilling the aqueous perchloric acid produced in Step 4 to produce a water overhead and concentrated perchloric acid bottoms;
   (6) recycling said concentrated perchloric acid bottoms from Step 5 and the aqueous perchloric acid bottoms from Step 3 to Step 1;
   (7) recycling the water overhead from Step 5 to Step 4;
   (8) contacting the nitrogen oxide and nitrogen dioxide of Step 4 with oxygen to produce nitrogen dioxide and nitrogen tetroxide; and
   (9) recycling said nitrogen dioxide and nitrogen tetroxide from Step 8 to Step 1.

10. The method of claim 9 wherein the nitrogen dioxide and nitrogen tetroxide produced in Step 8 are cooled prior to recycling to Step 1 to liquify said nitrogen tetroxide and separate it from said nitrogen dioxide.

References Cited

UNITED STATES PATENTS

| 1,291,909 | 9/1909 | Jensen | 23—160 |
| 1,434,674 | 11/1922 | Blowski | 23—160 |
| 1,868,868 | 7/1932 | Bahr | 23—162 XR |
| 2,053,834 | 9/1936 | Kachkaroff et al. | 23—162 XR |
| 2,332,181 | 10/1943 | Soule | 23—152 |
| 2,543,446 | 2/1951 | Egly | 23—157 |

EARL C. THOMAS, *Primary Examiner.*

OSCAR R. VERTIZ, *Examiner.*

B. H. LEVENSON, *Assistant Examiner.*